US009326500B2

(12) United States Patent
Overbaugh (10) Patent No.: US 9,326,500 B2
(45) Date of Patent: May 3, 2016

(54) HUNTING EQUIPMENT (71) Applicant: Anthony D Overbaugh, Winchester, VA (US)

(72) Inventor: Anthony D Overbaugh, Winchester, VA (US)

(73) Assignee: Nathan Stieren, Apple Valley, MN (US)

( * ) Notice: Subject to any disclaimer, the term of this patent is extended or adjusted under 35 U.S.C. 154(b) by 0 days.

(21) Appl. No.: 14/147,335

(22) Filed: Jan. 3, 2014

(65) Prior Publication Data

US 2014/0182969 A1 Jul. 3, 2014

Related U.S. Application Data (60) Provisional application No. 61/748,688, filed on Jan. 3, 2013.

(51) Int. Cl.
*A01M 31/02* (2006.01)
(52) U.S. Cl.
CPC ..................... *A01M 31/02* (2013.01)
(58) Field of Classification Search
CPC ....................................... A01M 31/02
USPC ................................ 182/116, 206
See application file for complete search history.

(56) References Cited

U.S. PATENT DOCUMENTS

| 1,658,191 | A | * | 2/1928 | Gravning | 182/206 |
| 2,232,414 | A | * | 2/1941 | Swann | 182/206 |
| 3,871,482 | A | | 3/1975 | Southard | |
| 4,552,246 | A | * | 11/1985 | Thomas | 182/116 |
| 4,603,757 | A | | 8/1986 | Hollinger | |
| 4,787,476 | A | | 11/1988 | Lee | |
| 4,995,476 | A | * | 2/1991 | Buck | 182/206 |
| 5,186,276 | A | | 2/1993 | Craig | |
| 5,234,077 | A | | 8/1993 | Sheriff | |
| 5,253,732 | A | | 10/1993 | Daniels | |
| 5,267,632 | A | | 12/1993 | Mintz | |
| 5,279,390 | A | | 1/1994 | Phillips | |
| 5,282,520 | A | | 2/1994 | Walker | |
| 5,564,524 | A | | 10/1996 | Thaggard et al. | |
| 5,590,738 | A | * | 1/1997 | Hunt et al. | 182/116 |
| 5,655,623 | A | | 8/1997 | Skyba | |
| 5,971,104 | A | | 10/1999 | Woller | |
| 6,308,801 | B1 | * | 10/2001 | Futch | 182/136 |
| 6,516,918 | B2 | | 2/2003 | Hess | |

(Continued)

FOREIGN PATENT DOCUMENTS

FR 2627175 A1 8/1989
FR 2657021 A1 7/1991

(Continued)

*Primary Examiner* — Alvin Chin-Shue
(74) *Attorney, Agent, or Firm* — Birch, Stewart, Kolasch & Birch, LLP (57) ABSTRACT

A platform is provided with a ladder to allow the user to easily ascend to the platform. A pair of stabilizing arms and jaws provides lateral stability to the ladder. A climbing stick has a pair of vertical posts attached between the front and rear walls of steps to provide a secure connection. The upper and lower ends extend inwardly and away from each other to provide a gripping surface. A tree stand has a male adapter with a bracket for securing a strap. The strap is used to secure the male adapter in place. Once secured to the tree, the platform area can be attached to the male adapter using a female adapter. The ability to first secure the smaller, lighter bracket and male adapter to a tree before attaching the platform using a female adapter increases the ease in securing the tree stand to a tree.

8 Claims, 8 Drawing Sheets

(56) References Cited

U.S. PATENT DOCUMENTS

| | | |
|---|---|---|
| 6,715,585 B1 | 4/2004 | Overbaugh |
| 6,830,128 B2 | 12/2004 | Burgeson |
| 6,988,588 B2 | 1/2006 | Prejean |
| 7,156,206 B2 | 1/2007 | Prejean |
| 7,681,850 B2 | 3/2010 | Johnson |
| 7,802,654 B2 | 9/2010 | Tolliver et al. |
| 7,963,368 B2 * | 6/2011 | Scudera et al. ............... 182/116 |
| 8,011,476 B1 * | 9/2011 | Alcon ............................ 182/206 |
| 8,042,652 B2 | 10/2011 | Weir |
| 8,240,432 B2 | 8/2012 | Call |
| 8,292,033 B2 | 10/2012 | Hale |
| 8,695,761 B1 * | 4/2014 | Berkbuegler ................ 182/116 |
| 8,794,383 B2 * | 8/2014 | Furseth et al. ................ 182/187 |
| 2002/0112919 A1 | 8/2002 | Graham, Jr. |
| 2005/0072631 A1 | 4/2005 | Tracey |
| 2008/0128204 A1 * | 6/2008 | Engstrom ..................... 182/116 |
| 2008/0156586 A1 | 7/2008 | Pestrue |
| 2011/0209944 A1 * | 9/2011 | Humphrey et al. ........... 182/116 |
| 2011/0297481 A1 | 12/2011 | Copus |
| 2012/0080267 A1 | 4/2012 | Furseth et al. |
| 2012/0080269 A1 | 4/2012 | Furseth et al. |

FOREIGN PATENT DOCUMENTS

| | | |
|---|---|---|
| FR | 2686023 A1 | 7/1993 |
| WO | WO 93/00967 A1 | 1/1993 |

\* cited by examiner

HUNTING EQUIPMENT

This application claims the benefit of provisional application 61/748,688, filed on Jan. 3, 2013, the contents of which are incorporated herein by reference.

BACKGROUND OF THE INVENTION

Hunting requires carrying equipment deep into the woods to a hunting spot. The trip to the hunting spot may be long and inaccessible by motorized vehicle, requiring hunters to carry all necessary equipment. For that reason, the equipment must be light, compact and easy to carry. Typical equipment includes a tree ladder and climbing stick. These devices enable a hunter to climb a tree. The higher elevation of a tree provides a better vantage point for hunters to survey the surroundings. Also, it is safer for hunters to be in an elevated position, as errant arrows quickly hit the ground.

It is an object of the invention to provide a tree stand with attached ladder that's securely attaches to a tree.

It is an object invention to provide a tree stand with attached ladder that is lightweight and compact.

It is yet another object invention to provide a tree stand with ladder that quickly and easily attaches to a tree.

It is yet another object invention to provide a climbing stick which is lightweight and easy to manufacture.

It is still another object invention to provide a climbing stick having steps, each having a central opening to prevent clogging with mud or collecting water.

These and other objects of the invention will become apparent to one of ordinary skill in the art after reading the disclosure of the invention.

SUMMARY OF THE INVENTION

The equipment for climbing a tree must be easy to carry, stable when attached to a tree, and if providing a platform for standing or sitting, must be comfortable for long periods of time. A platform is provided with a ladder to allow the user to easily ascend to the platform. A seat allows for the user to spend long periods of time on the platform. A pair of stabilizing arms extending from the sides of the ladder provides lateral stability to the ladder. In addition, a pair of jaws extends from the platform to grip the tree and provide lateral stability.

A climbing stick has a pair of vertical posts attached between the front and rear walls of steps to provide a secure connection. The upper and lower ends extend inwardly and away from each other to provide a gripping surface when the climbing stick is secured to a tree by straps.

A tree stand has a male adapter with a bracket for securing a strap. The strap is used to secure the male adapter in place. Once secured to the tree, the platform area can be attached to the male adapter using a female adapter. The ability to first secure the smaller, lighter bracket and male adapter to a tree before attaching the platform using a female adapter increases the ease in securing the tree stand to a tree.

DETAILED DESCRIPTION OF THE INVENTION

Figure 1:
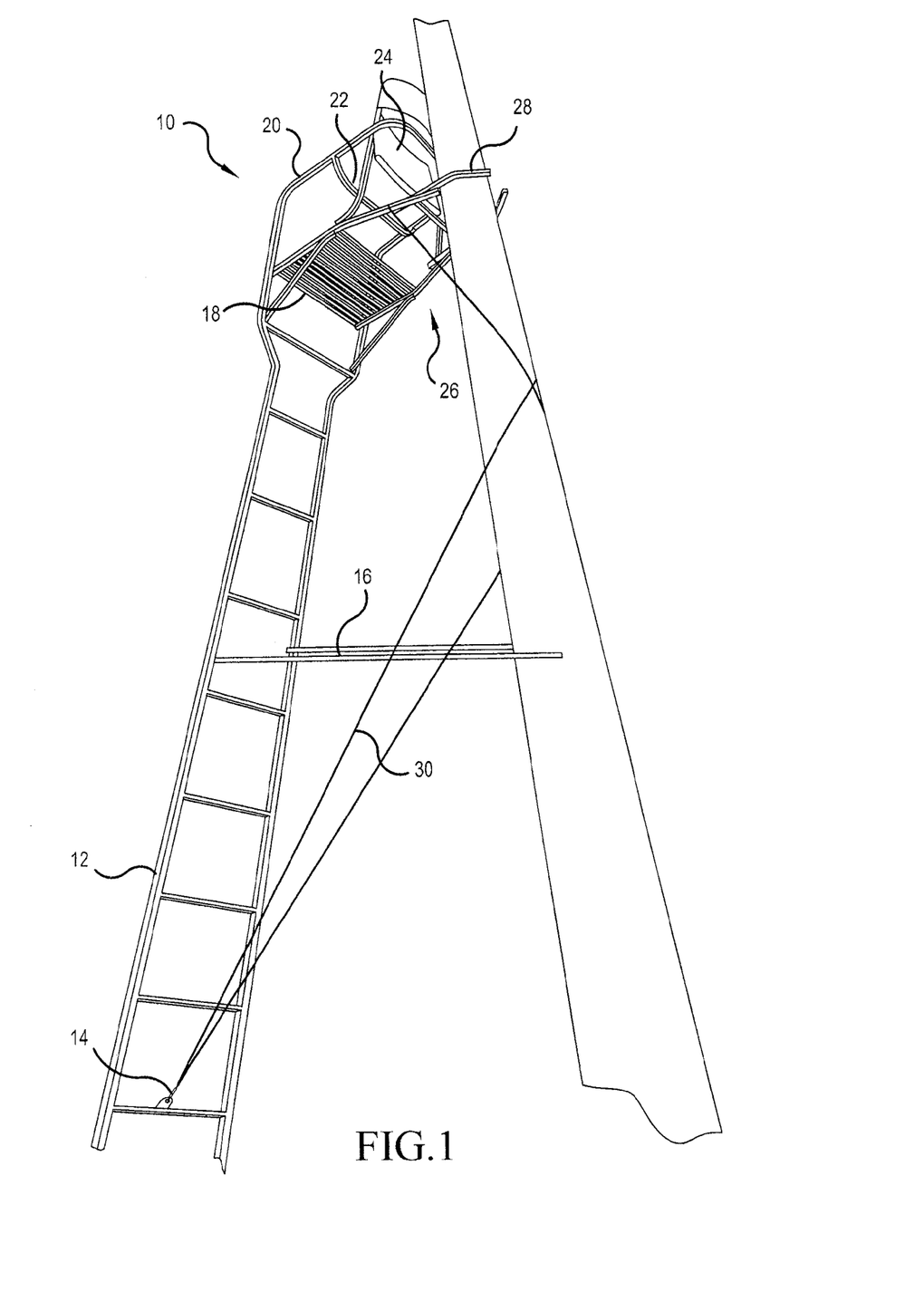
FIG. 1 is a rear perspective view of the tree stand and a ladder attached to a tree.

FIG. 1 is a rear perspective view of a tree stand and ladder 10 attached to a tree. The ladder 12 extends from the ground to a platform 18. The ladder 12 is formed in sections that connect to one another by an end of one section telescopingly fitting into an end of the next section. While sections may be any length, a length of four feet allows four sections of ladder to reach a height of sixteen feet. A protrusion from one of the lower rungs of the ladder secures a tensioner, such as a turn buckle 14, as will be described later. A pair of stabilizer arms 16 extends from either side of the ladder and engages the side of the tree. The stabilizer arms 16 are secured to tree as will also be described later.

The platform 18 is a rectangular grid allowing water to pass through the platform but still providing a secure, stable surface for a person to stand. A handrail 20 extends from each front corner and extends towards the rear of the platform to increase safety. A rear bar extends between the rear ends of the handrails to provide rigidity to the handrails and also provide a surface for bearing against a tree. A crossmember 22 extends between the handrails 20 to provide extra stability to the handrails. A seat 24 is formed between the handrails 20 and provides the user a place to sit for extended periods of time.

A trapezoidal frame extends from the rear edge of the platform 18. The end of the trapezoidal frame engages a tree. The engagement end may be provided with a serrated surface to increase the grip of the trapezoidal frame to the tree. The frame secures the platform and ladder in spaced relation from the tree and prevents movement toward the tree. Pivotally attached to each side of the trapezoidal frame is a curved jaw 28 that engages the side of the tray. Preferably, the jaw is J-shaped. The inner surface of each jaw is also provided with serrations to increase the grip of the jaw to a tree.

Figure 2:
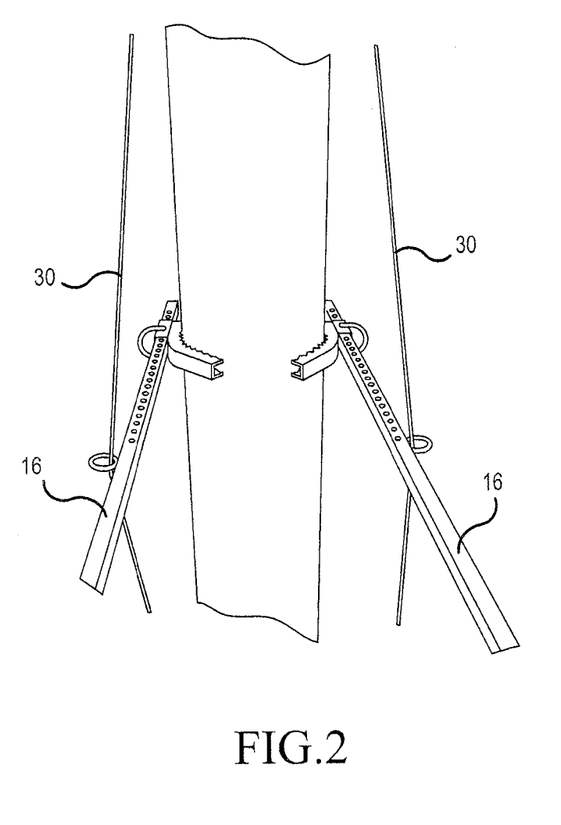
FIG. 2 is a front perspective view of the stabilizer arms.

A pair of cables 30 secures the jaws and stabilizer arms 16 to the tree to increase lateral stability of the tree stand and ladder. A cable 30 attaches to each jaw and pivots the jaw when the cables moved, such as under tension applied by the turnbuckle. Preferably, the cables cross each other at a rear of the tree as seen in FIG. 1 and extend to the turnbuckle 14 by passing through cable guides, such as eyelets, on the outside surface of the stabilizer arms 16, as seen in FIG. 2. The turnbuckle allows the cables to be drawn in, effectively shortening the length of the cables and drawing the cables closer together. In doing so, the cables urge the jaws 28 together and, in a similar manner, urge the stabilizer arms 16 together. The effect of the cables applying force to the jaws 28 and stabilizer arms 16 increases the force applied by these elements to the tree. The jaws and stabilizer arms prevent lateral movement of the stand which is of particular importance when the user is ascending or descending the stand by using the ladder.

FIG. 2 shows the details of stabilizer arms 16. The stabilizer arms can be provided with a gripping surface having serrations to better grip the tree. The gripping surface is adjustably attached to the stabilizer arms. As shown, both the stabilizer arms and gripper surface are provided with apertures, and the gripping surface fits over the stabilizer arms in a telescoping manner. When the apertures of the gripping surface and stabilizer arms are aligned, a fastener can secure the two elements together. The ability to secure the gripping surface at different points along the stabilizer arms increases the ease in connecting the ladder to a tree. The gripping surfaces are curved to increase the contact area with a tree.

The arms are pivotally and removably joined to the ladder by any suitable means, such as a threaded fastener. The distance between the arms is adjustable to account for different diameter trees. Preferably, the arms are located near the midpoint of the ladder to increase their effectiveness in providing lateral stability to the ladder. The bottom end of the ladder grips the ground. The stabilizer arms provide lateral stability to the middle of the ladder and the jaws provide lateral stability to the platform.

Figure 3:
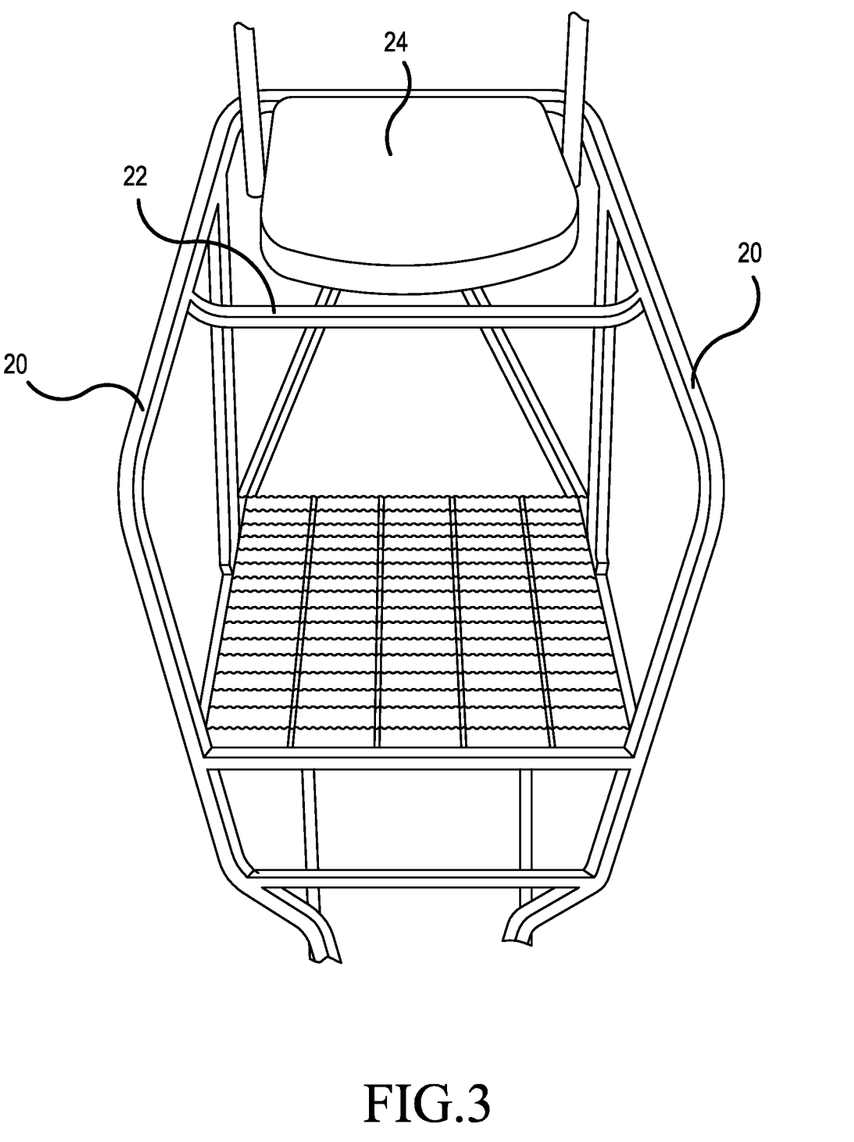
FIG. 3 is a front perspective view of the stand.
Figure 4:
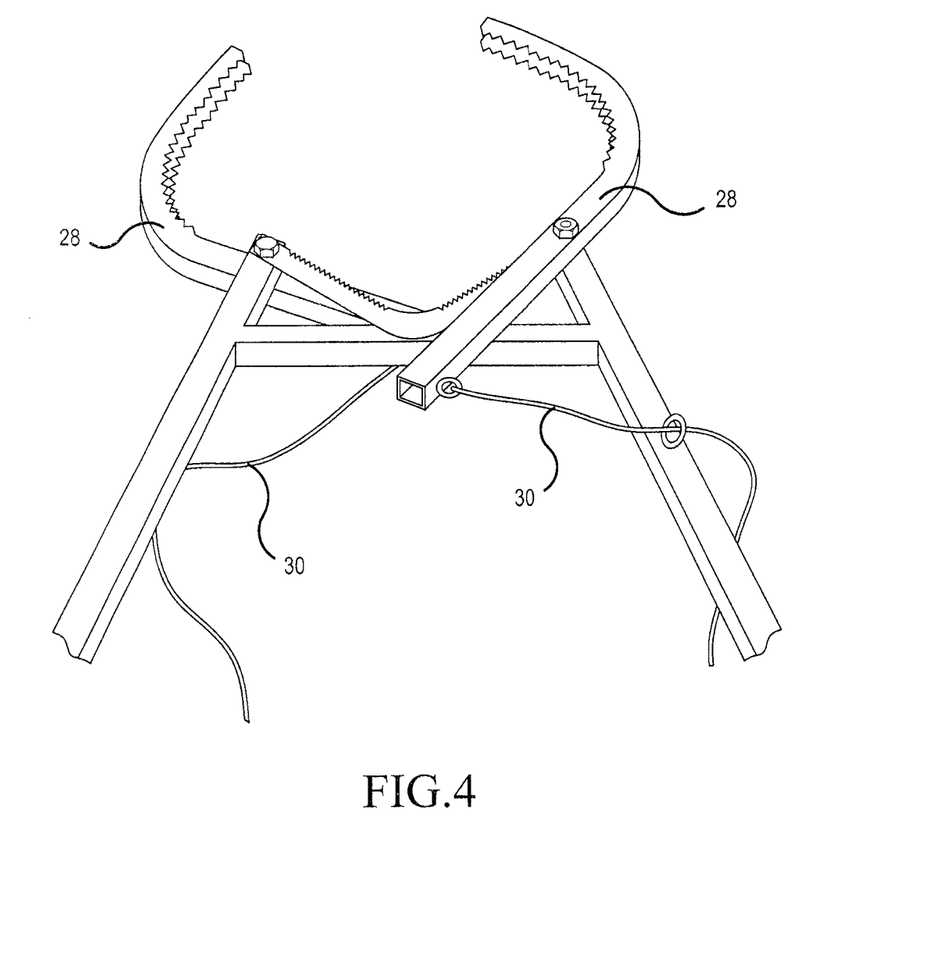
FIG. 4 is a front perspective view of the J-shaped jaws.

FIG. 3 is a top view of the stand, clearly showing the platform 18 with the handrails 20, crossmember 22 and seat 24. Also seen is a portion of the trapezoidal frame, which will be discussed latter. The rear bar extending between the handrails and end of the trapezoidal frame 26 are in the same vertical plane to provide surfaces for bearing against the tree. FIG. 4 shows the trapezoidal frame 26 and jaws 28 which are pivotally connected to the trapezoidal frame. The end of the trapezoidal frame has a V-shape having serrations to increase the contact area between the frame and tree. The cables are connected to an end of the jaws distal to the tree so that pulling on the cables causes pivoting motion of the jaws. The cables pass through cable guides, such as eyelets, on the frame to provide a guide and increase the ease in operating the jaws through the cables.

Figure 5:
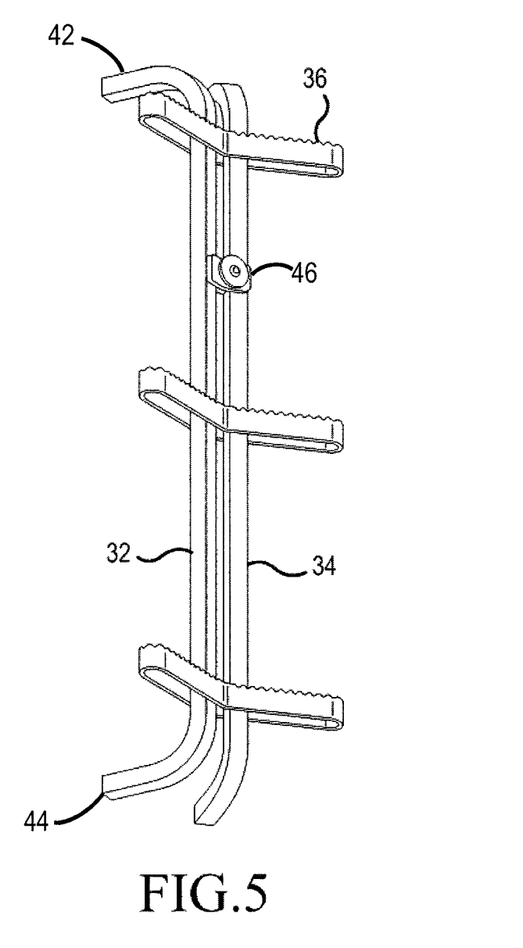
FIG. 5 is a side perspective view of a climbing stick.

A climbing stick is seen in FIG. 5. The climbing stick has a pair of vertical posts 32, 34 and a plurality of steps 36 connected to the vertical posts. The vertical posts 32, 34 are preferably formed from steel or aluminum square tubing, and each has an inwardly extending upper end 44 and inwardly extending lower end 44. The ladder may also be formed of U-shaped channels to prevent water from collecting in the ladder, increasing the weight and causing damage upon freezing. If made from U-shaped channel, a square piece of tubing is attached to one end of the section to receive an end of the next section, the square piece of tubing having inner dimensions to securely retain the U-shaped channel. A separate connecting member 46 is a plate that can be welded to both vertical posts or secured with a threaded fastener. The connecting member also provides an attachment point for straps to secure the climbing stick to a tree.

Figure 6:
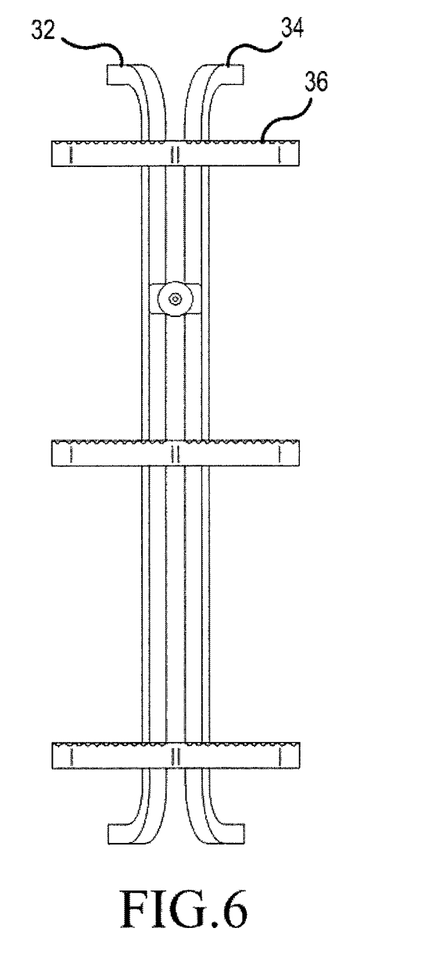
FIG. 6 is a front view of the climbing stick.
Figure 7:
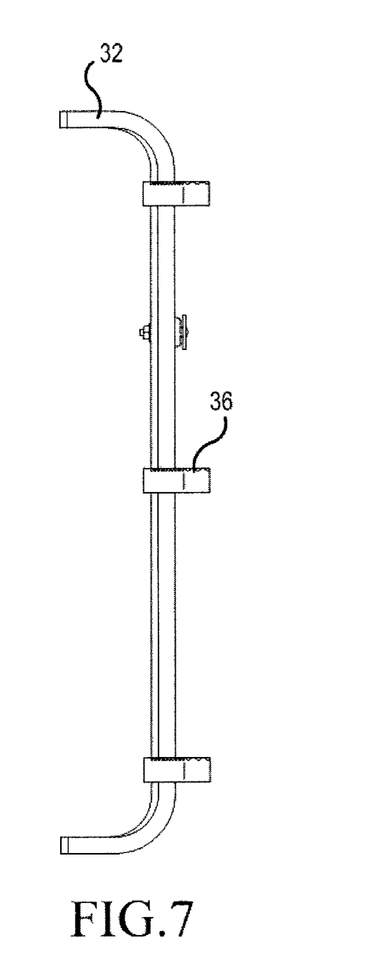
FIG. 7 is a side view of the climbing stick.

FIG. 6 is a front view of the climbing stick showing three steps 36. The steps are equally spaced one another, with the lowermost step formed near the bottom of the posts 32, 34. The climbing stick is attached to the tree at a height to position the lowest step at a convenient height for the user to be the lowermost rung. While the climbing stick shows 3 steps, any number of steps can be attached to the vertical posts. FIG. 7 is a side view of the climbing stick and the attachment point on the connecting member for the straps can be seen. The attachment point is shown as secured to the post with a threaded shaft extending between the post and secured with a threaded nut but, as mentioned above can be secured in other manners, such as welding.

Figure 8:
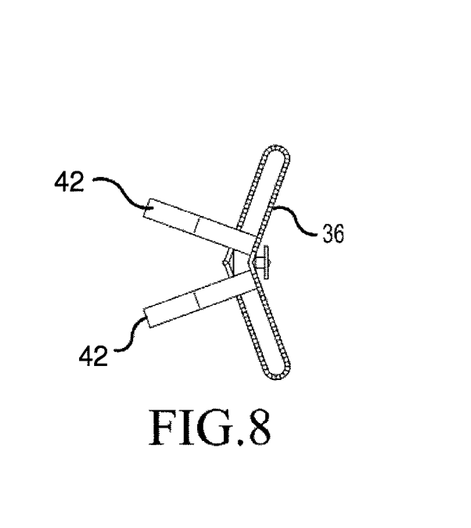
FIG. 8 is a top view of the climbing stick.

As best seen in FIG. 8, the steps have a wedge shape so that the steps extend outwardly from the posts, providing easier access by the user's foot. The wedge shape allows the steps to extend away from the tree. The steps are formed from a strip of metal to have an inner wall and outer wall forming a hollow interior. The top edge of each step is serrated to increase grip. The serrations and hollow interior prevent mud, water and debris build up on the steps and increase safety. The distance between the inner and outer walls is equal to the size of the square tubing used to form the vertical posts 32, 34. The posts then fit within the hollow interior between the inner and outer walls of the steps. The front and rear sides are attached to the inner and outer walls by any suitable means, such as welding. This provides a secure connection between the steps 36 and vertical posts. A slight V-shaped between the upper ends 42 and lower ends 44 of the vertical posts results from the connection of the vertical posts to different sides of the steps, as best seen in FIG. 8. The angle formed between the upper ends and lower ends of the posts is preferably about 40-45 degrees and increases the contact area between the upper ends 42 and lower ends 44 of the vertical posts and the tree.

Figure 9:
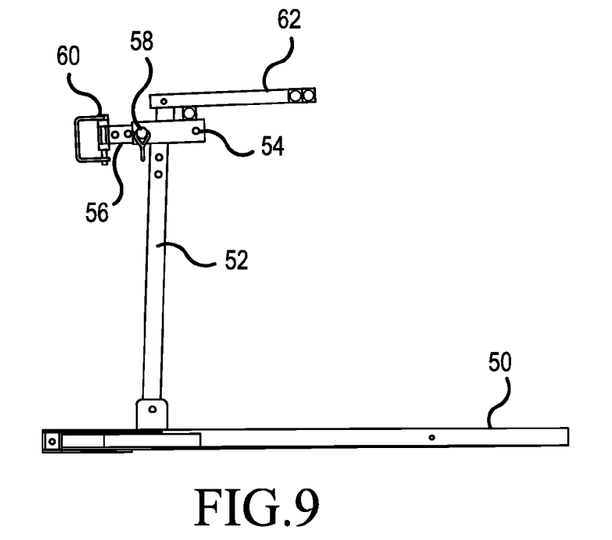
FIG. 9 is a side view of a tree stand.
Figure 10:
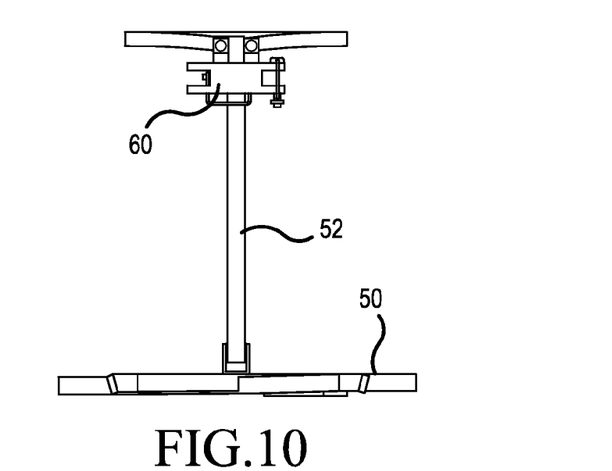
FIG. 10 is a front view of the tree stand.

FIG. 9 depicts a treestand having a standing platform 50 with a vertical seat post 52 extending upwardly from the platform area 50. The vertical seat post 52 is pivotally connected to the platform area, allowing the seat post to be folded flat against the platform area for transportation. Once folded, a climbing stick, such as depicted in FIG. 5, can be attached to the platform by any suitable means, such as bungee cords. A male/female adapter is connected to the top of the seat post 52. The female adapter 54 receives the male adapter 56. Each of the male and female adapters has a series of holes. The relative position of the male adapter within the female adapter can be set by extending a hinge pin 58 through aligned holes of the male and female adapters. The adjustment of the male adapter within the female adapter sets the distance between the tree and seat post 52. The male adapter 56 has a tree attachment bracket 60. The tree attachment bracket is like a "Reese" style hitch.

The tree stand is not a "self climbing" treestand. In order to secure the tree stand to a tree, a user can attach the male adapter 56 to a tree using a strap extending through the bracket 60. The strap may be any suitable type, such as a ratcheting strap. Attaching only the male adapter is much less cumbersome than trying to attach the entire treestand. Once the male adapter has been strapped to a tree, the stand is lifted into place and the female adapter attached to the male adapter and the two adapters are secured to one another with a hinge pin 58. The seat 62 extends from the top of the seat post 52.

Figure 11:
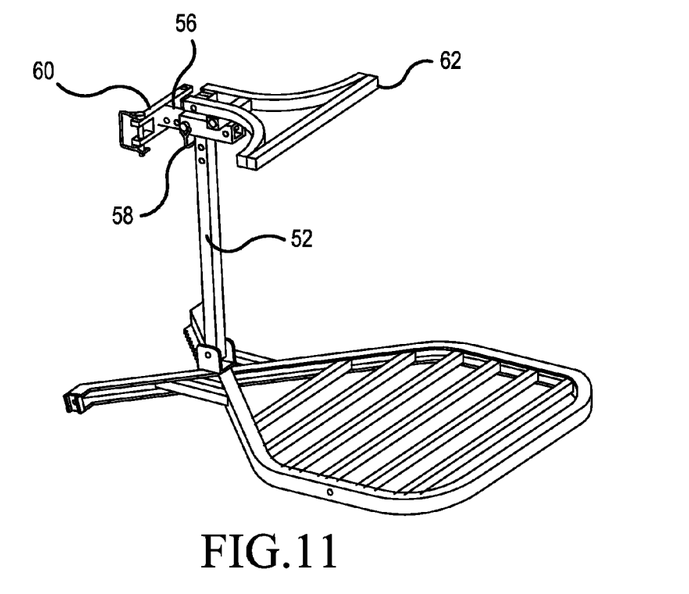
FIG. 11 is a side perspective view of the tree stand.

The various parts are also clearly seen in FIG. 11 where the seat 62 is better seen. In addition, FIG. 11 more clearly depicts the attachment bracket 60. As noted earlier, it is necessary for the hunter to climb the tree to attach the male adapter securely to tree before attaching the tree stand to the male adapter by having the male adapter received within the female adapters. The strap is used to secure the male adapter in place. Once secured to the tree, the platform area can be attached to the male adapter using a female adapter. The ability to first secure the smaller, lighter bracket and male adapter to a tree before attaching the platform using a female adapter increases the ease in securing the tree stand to a tree.

Figure 12:
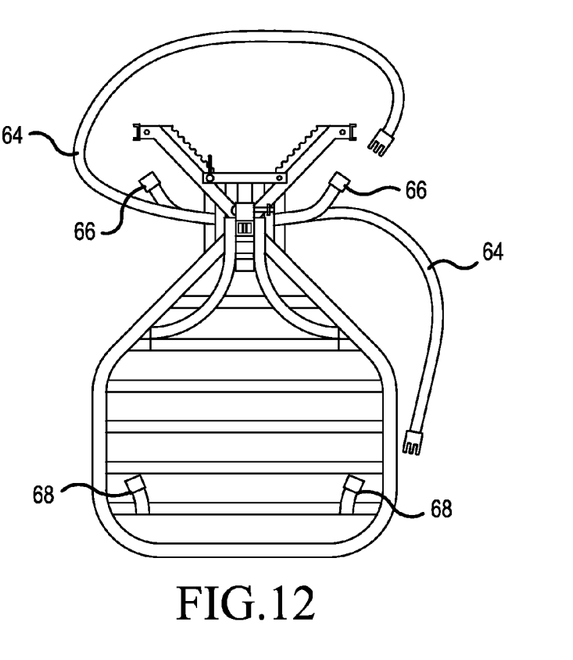
FIG. 12 is a top view of the platform having straps.

FIG. 12 shows the platform having straps connected to the rear of the frame. A pair of straps 64 is attached to a rear portion of the platform. The ends of the straps are provided with one half on a mating connector, such as a female connector. One or both straps is provided with an extension 66 having the other half of the mating connector, such as a male connector. A connector 68 being the same type of connector attached to the extension is also attached to a front portion of the platform. Therefore, the straps can be attached to the connectors 68 to form shoulder straps to carry the platform. Once the platform is attached to the tree, the straps can be wrapped around the tree and secured to the extension of the opposite strap to provide stability to the platform. Alternatively, the left strap can be provided with one mating connector and the right strap can be provided with the other half of the mating connector, allowing the straps to be connected to one another. For instance, the left strap can be provided with a male connector and the right strap can be provided with a female connector. In this case, the left connector 68 would be a female connector and the right connector 68 would be a male connector.

The invention has been describes with reference to preferred embodiments. Variations and modification would be apparent to one of ordinary skill in the art, and the invention encompasses such variations and modifications.

What is claimed is:

1. A tree stand, comprising:
   a platform,
   a ladder attached to a front edge of the platform and extending downwardly from the platform,
   a pair of jaws pivotally connected to the platform at a pivot point, each jaw having a first section extending from the pivot point toward the front edge of the platform and a second section extending from the pivot point away from the front edge of the platform;
   each side of the ladder having a stabilizer arm extending therefrom, the stabilizer arms attached to a point between a top end and a bottom end of the ladder;
   a first cable guide attached to each stabilizer arm;
   a pair of cables, the pair of cables comprising:
      a first cable attached to a first connection point on the first section a first jaw of said pair of jaws and extending through a first cable guide on a first stabilizer arm of said stabilizer arms; and
      a second cable attached to a first connection point on the first section a second jaw of said pair of jaws and extending through a first cable guide on a second stabilizer arm of said stabilizer arms,
   wherein each cable causes pivoting of the jaw of a respective of said pair of jaws when tension is applied to the cable, and
   a cable tensioner attached to the ladder, the pair of cables attached to the cable tensioner,
   wherein tension applied to the cables from the cable tensioner causes a distal ends of the of jaws to move closer together and the pair of stabilizer arms to move closer together.

2. The tree stand of claim 1, wherein the stabilizer arms are releasably attached to the ladder.

3. The tree stand of claim 1, further comprising second cable guides attached to the platform, each cable passing through a respective one of the second cable guides.

4. The tree stand of claim 1, wherein the platform comprises:
   a base, and
   a frame extending from the base,
   wherein the pair of jaws are pivotally connected to the frame.

5. The tree stand of claim 4, further comprising second cable guides attached to the frame, each cable passing through a respective one of the second cable guides.

6. The tree stand of claim 1, wherein the cable tensioner is attached to the ladder at a point below the stabilizer arms.

7. The tree stand of claim 1, wherein the ladder has a first side, a second side and a plurality of rungs extending between the first side and the second side.

8. The tree stand of claim 1, wherein each jaw is independently pivotable.

* * * * *